J. W. SEE.
Suppository-Mold.
No. 224,734.          Patented Feb. 17, 1880.
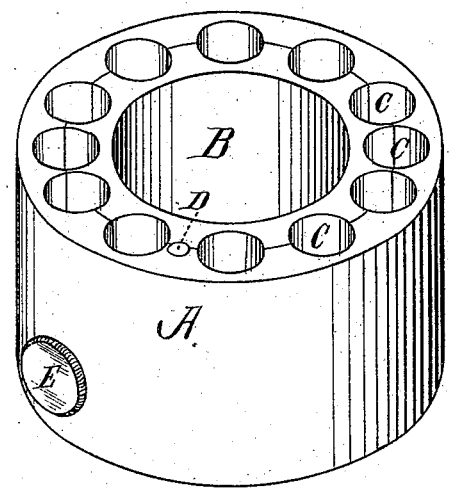
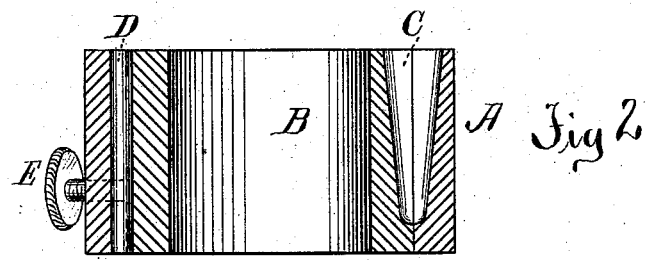
WITNESSES:          James W. See INVENTOR

UNITED STATES PATENT OFFICE.

JAMES W. SEE, OF HAMILTON, OHIO.

SUPPOSITORY-MOLD.

SPECIFICATION forming part of Letters Patent No. 224,734, dated February 17, 1880.

Application filed September 24, 1878.

*To all whom it may concern:*

Be it known that I, JAMES W. SEE, of Hamilton, Butler county, Ohio, have invented certain new and useful Improvements in Suppository-Molds, of which the following is a specification.

My invention relates to molds for prescriptionists' use in making suppositories.

It has for its object the production of a mold which will obviate much of the usual risk and save much of the usual time involved in use; and it consists of one cylinder sliding within another, rotation being prevented by a feather, the mold-cells being formed in the contacting surfaces of the two cylinders.

In the accompanying drawings, Figure 1 is a perspective view, and Fig. 2 a sectional view, of a mold for making twelve suppositories at one pouring.

A is a ring, into which fits freely the ring B. The interior ring is prevented from revolving in the exterior ring by the feather D, and the two rings are held together by the set-screw E. The mold-cells C are arranged in a circle with half their volume in each of the rings.

The mode of operation is as follows: The parts are placed together and the set-screw tightened. The molds are then filled and cooled, as usual. When properly cooled the inner ring is pushed slightly downward through the outer one. This loosens the suppositories from the inner ring without the least tendency to break them; in fact it compresses them. The inner ring is then pushed upward and out of the outer ring. They will then drop from the inner ring. The set-screw keeps the parts from slipping while being handled and cooled.

Owing to the compacting action of the mold, the suppositories may be removed much quicker than is usual with molds which in opening exert a tearing strain on the suppositories.

I do not claim as my invention the plan of splitting the cells longitudinally. This is an old idea both for suppository and bullet molds, the two halves of the molds having been retained in place by hinges, clasps, and rubber bands.

I claim as my invention—

A suppository-mold formed in two circular sections, A and B, feathered together to prevent rotation, and having mold-cells C, with half their volume in each section of the mold, substantially as specified.

JAMES W. SEE.

Witnesses:
NELSON WILLIAMS,
JOHN R. WOODS.